Dec. 7, 1971 R. C. THOMPSON 3,624,850
BUILDING BLOCK SWEEP AND PALLET SCRAPER
Filed Dec. 1, 1969 5 Sheets-Sheet 1

INVENTOR
RICHARD C. THOMPSON

BY
ATTORNEYS

Dec. 7, 1971 R. C. THOMPSON 3,624,850
BUILDING BLOCK SWEEP AND PALLET SCRAPER
Filed Dec. 1, 1969 5 Sheets-Sheet 2
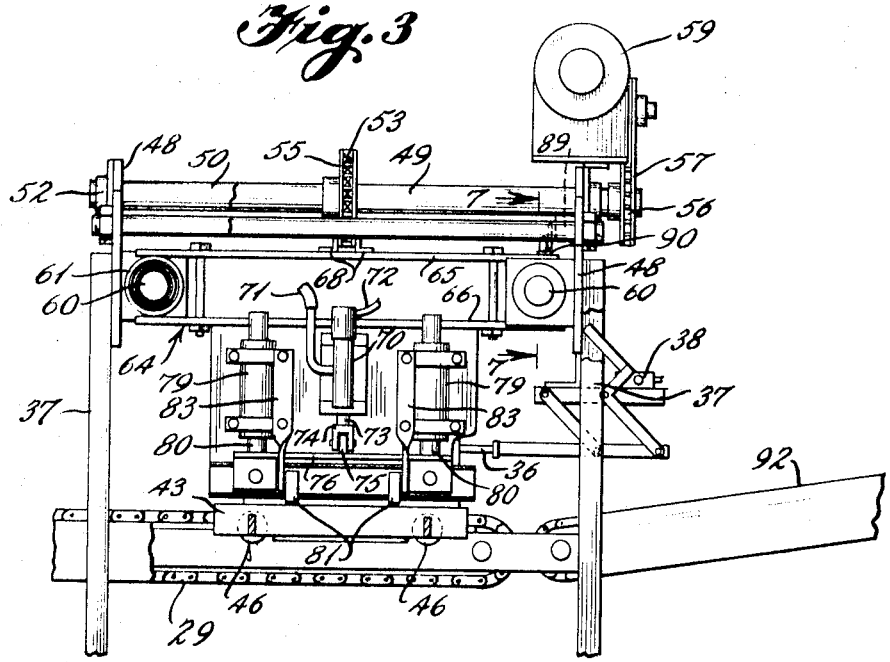
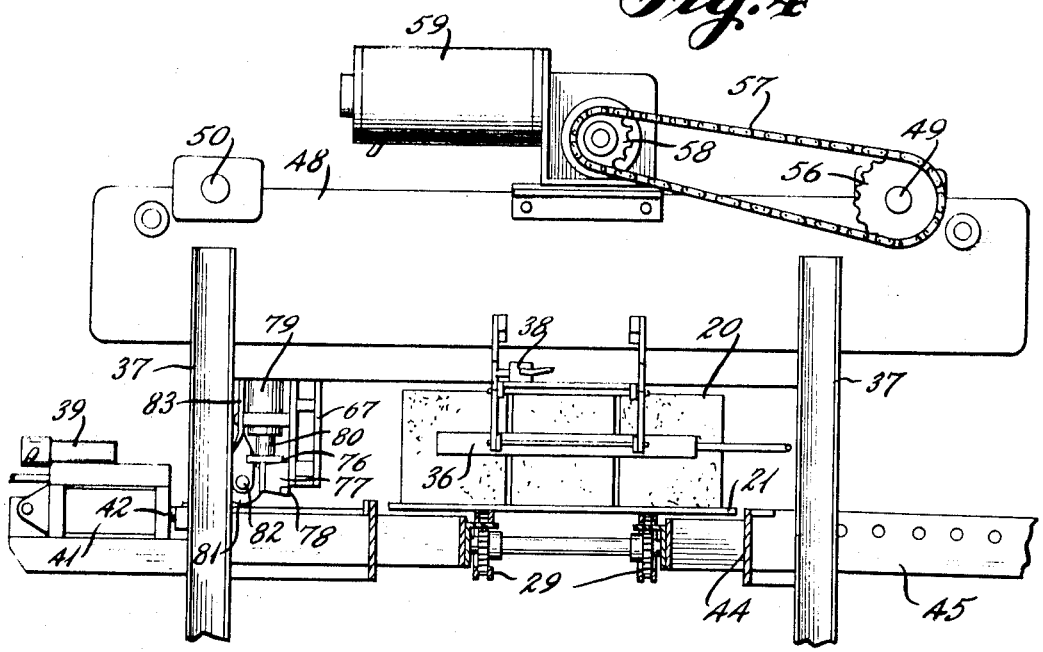
INVENTOR
RICHARD C. THOMPSON
BY
ATTORNEYS Dec. 7, 1971  R. C. THOMPSON  3,624,850
BUILDING BLOCK SWEEP AND PALLET SCRAPER
Filed Dec. 1, 1969  5 Sheets-Sheet 3
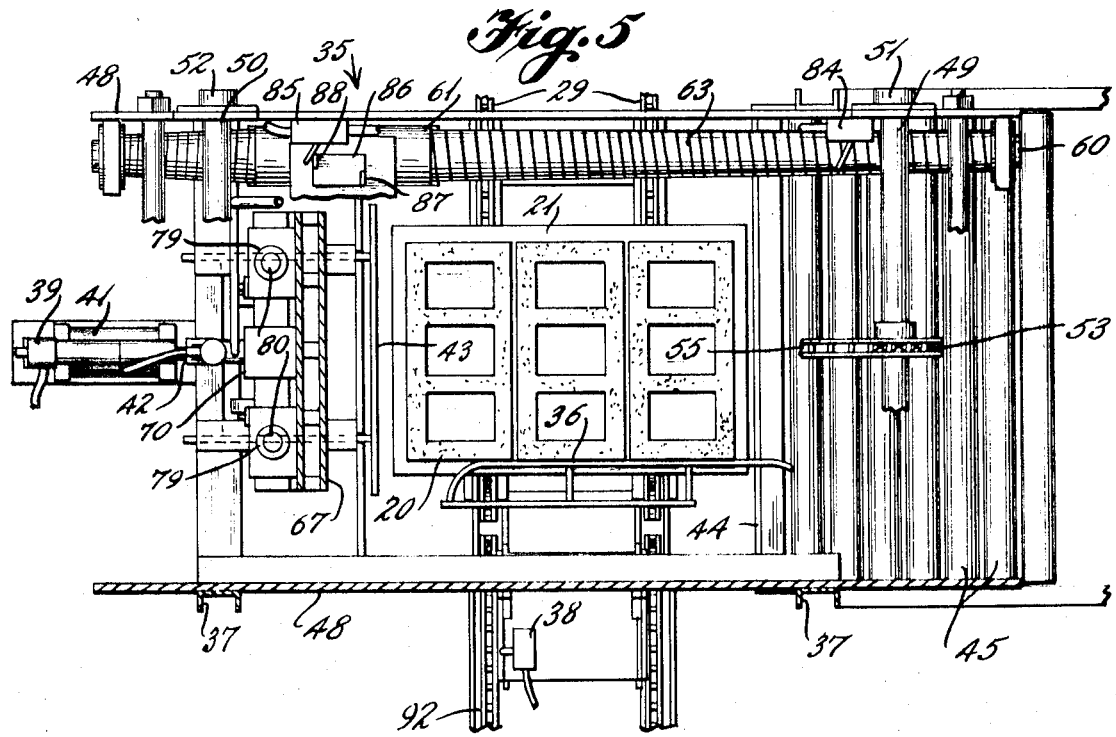
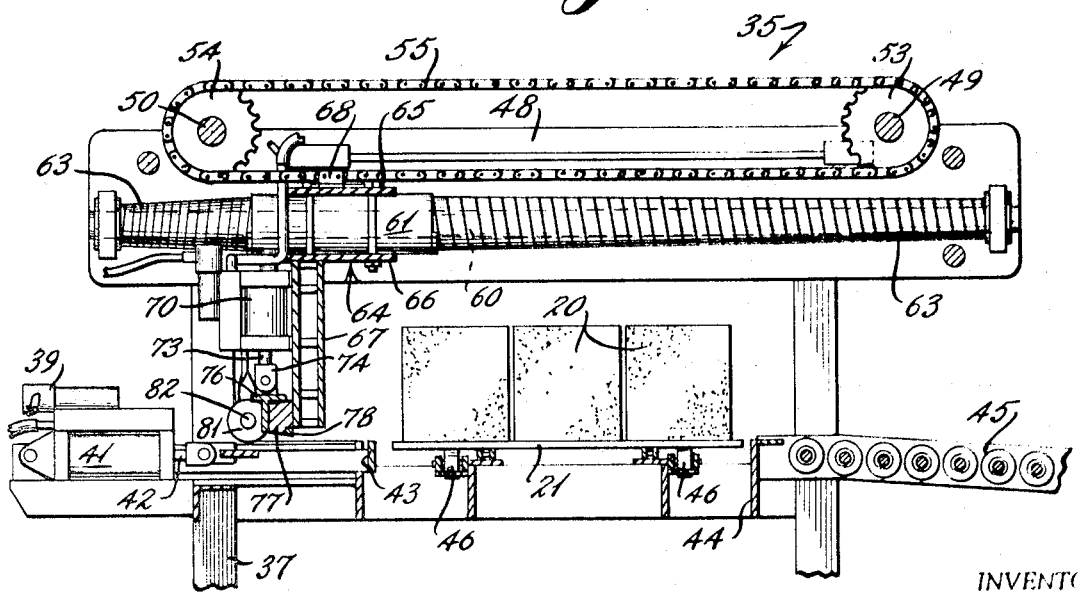
INVENTOR
RICHARD C. THOMPSON
BY
ATTORNEYS

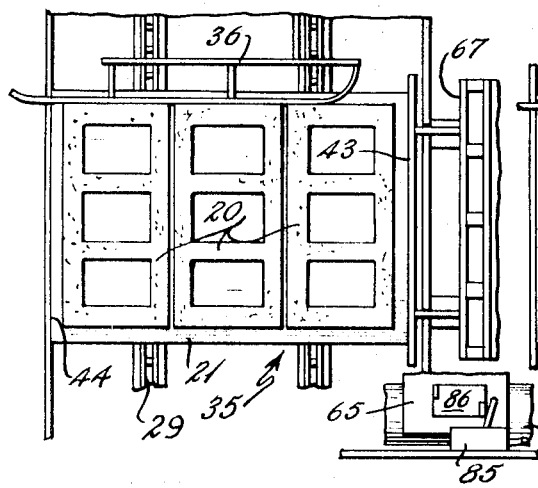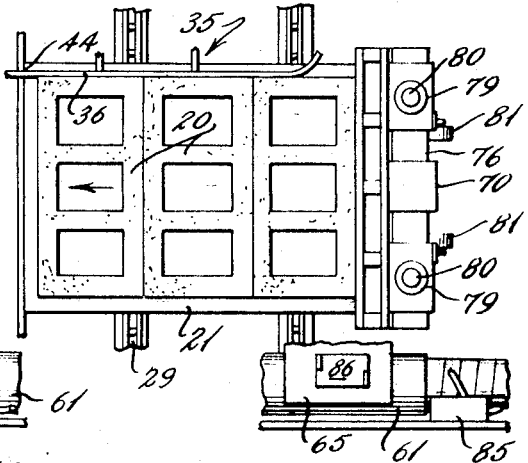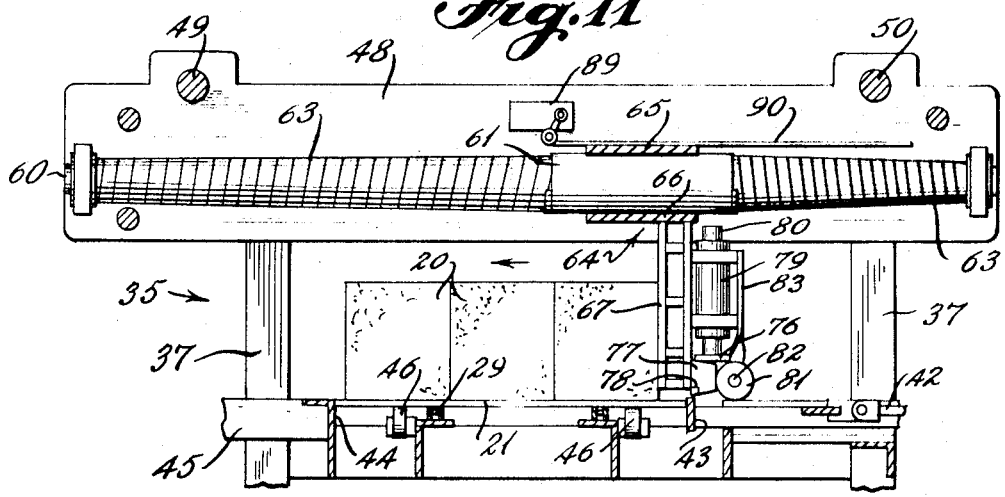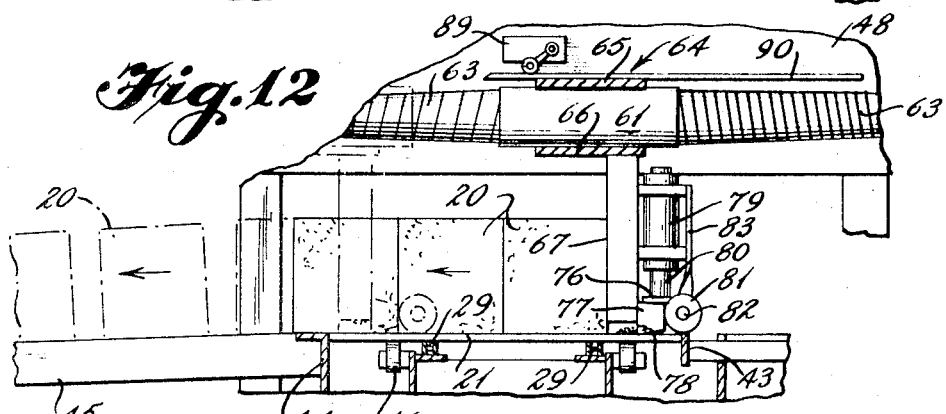

United States Patent Office 3,624,850
Patented Dec. 7, 1971

3,624,850
BUILDING BLOCK SWEEP AND PALLET SCRAPER
Richard C. Thompson, Chesapeake, Va., assignor to Southern Block and Pipe Corporation, Norfolk, Va.
Filed Dec. 1, 1969, Ser. No. 881,042
Int. Cl. B65g 69/00
U.S. Cl. 15—4
10 Claims

ABSTRACT OF THE DISCLOSURE

Apparatus for removing articles from pallets on which they have been formed while in a plastic state and have hardened, and for simultaneously scraping the pallets to remove unwanted residue and place the pallets in condition to receive other articles to be formed.

BACKGROUND OF THE INVENTION

(1) Field of the invention

This invention relates generally to the formation and handling of various articles which are formed on pallets or the like while in a plastic condition and which have a tendency to adhere to the pallets, and relates particularly to the handling of building blocks after they have been formed on pallets and cured.

(2) Description of the prior art

Heretofore bricks, cement building blocks and the like have been molded on pallets while in a semi-liquid or plastic state and thereafter the molds have been removed and the bricks and blocks have been cured, either in a kiln or oven or by exposure to the atmosphere until the material was completely hardened. After the bricks and blocks were cured, they were removed from the pallets on which they were formed and normally were stacked in a holding or storage area until delivered to a job site. Many efforts have been made to remove the bricks and blocks from the pallets automatically and for scraping the pallets to remove the residue which has adhered thereto. However, these efforts have not been entirely successful due to the highly abrasive quality of the material being handled, as well as the machinery involved being complicated and expensive. Specifically the highly abrasive dust which is inherent in the material being used has settled on working surfaces and has caused complementary interfitting or sliding surfaces to be scored to the point where they were no longer useful. Normally the efforts which have been made to scrape the pallets have been accomplished after the bricks or blocks have been removed and the pallets were being transferred from the discharge station to the loading station, and this has involved independent relatively expensive machinery which has delayed the return of the pallets to the loading station. In the relatively modern plant where applicant is employed, the pallets have been scraped periodically by manual labor and this has resulted not only in a delay in the operation of the plant, but in slightly misformed blocks prior to the cleaning operation. The manual labor has cost approximately $8,000 each time the cleaning operation has been performed and this has occurred approximately four times a year.

SUMMARY OF THE INVENTION

The present invention is a building block sweep and pallet scraper which automatically removes pallets having blocks mounted thereon from a destacking machine, moves the pallets and blocks into a fixed position, removes the blocks from each pallet while simultaneously scraping the upper surface of the pallet and thereafter discharges the blocks along one conveyor and the pallets along a second conveyor with the second conveyor returning the pallets to the loading station or to any other desired location. The structure includes apparatus for aligning the pallet with the block discharge conveyor, a sweeper apparatus which engages the blocks and moves the blocks from the pallet onto the discharge conveyor, a scraper blade adapted to be moved downwardly into engagement with the upper surface of the pallet while the blocks are being removed and for returning the sweeper and scraper mechanisms to their initial positions and then automatically introducing another pallet having blocks thereon.

It is an object of the invention to provide a building block sweep and pallet scraper which will automatically remove building blocks from a pallet rapidly and efficiently and simultaneously will scrape the upper surface of the pallet to remove any foreign material adhering thereto to place the pallet in condition for reuse.

BRIEF DESCRIPTION OF THE DRAWINGS

FIG. 3 is an enlarged section on the line 3—3 of FIG. 1.
FIG. 4 is an enlarged section on the line 4—4 of FIG. 1.
FIG. 5 is an enlarged section on the line 5—5 of FIG. 2.
FIG. 6 is an enlarged longitudinal section on the line 6—6 of FIG. 1.
FIG. 9 is an enlarged top plan view illustrating the first step in the removal of the blocks from the pallet.
FIG. 10 is a top plan view similar to FIG. 9 illustrating the next step.
FIG. 11 is a side elevation of the step shown in FIG. 10.
FIG. 12 is a side elevation similar to FIG. 11 illustrating the blocks being removed from the pallet and the upper surface of the pallet being scraped.

DESCRIPTION OF THE PREFERRED EMBODIMENT

Figures 1, 2:
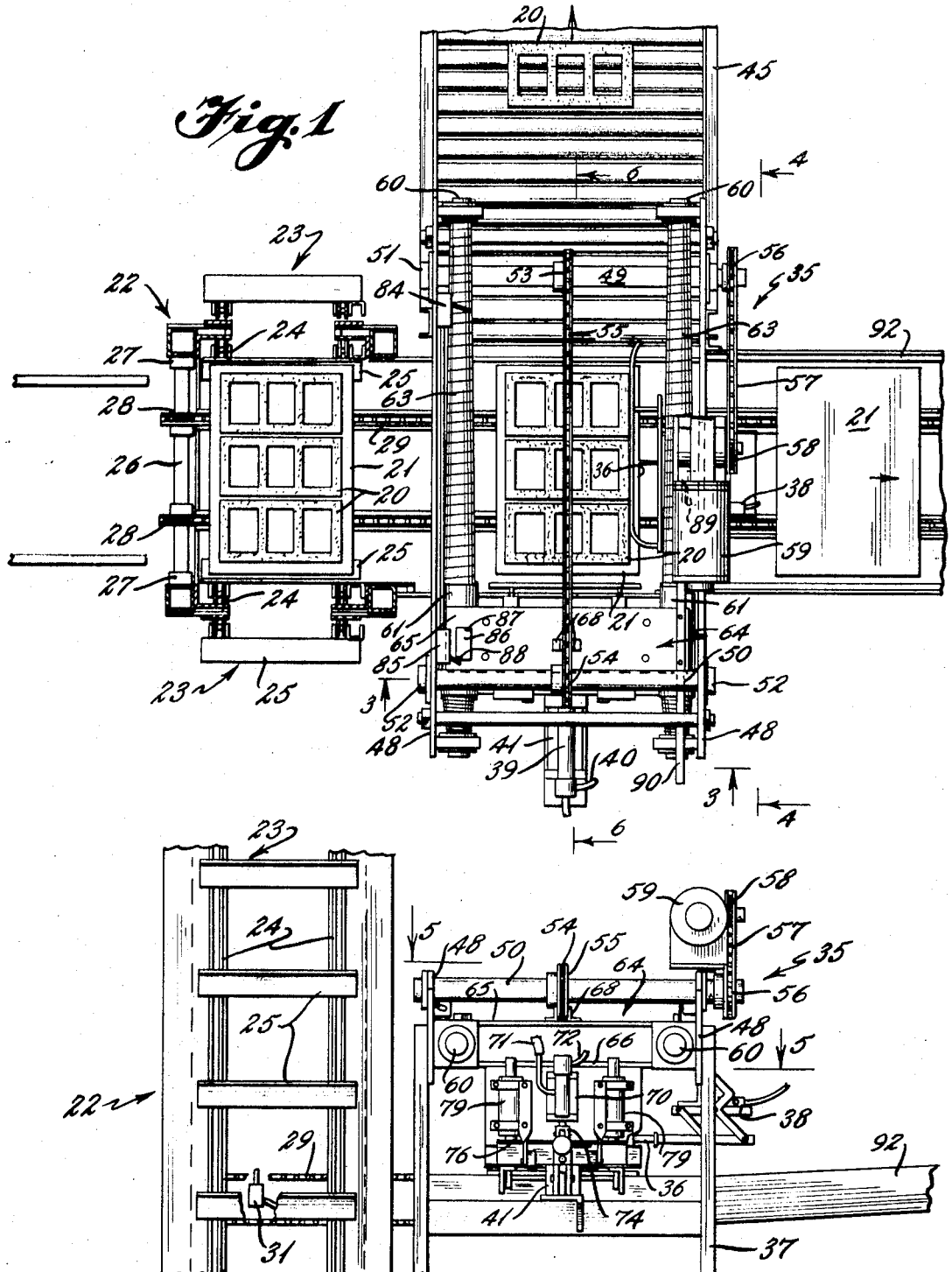
FIG. 1 is a top plan view of the building block sweep and pallet scraper of the present invention.
FIG. 2 is an end elevation thereof.

With continuted reference to the drawings, brick or building blocks 20 are formed on pallets 21 while in a plastic state and then are hardened or cured in any conventional manner. After the blocks have been cured, the pallets are placed in a destacking machine 22 having a generally vertically disposed conveyor 23. The conveyor 23 includes a pair of chains or conveyor runs 24 at each side of the destacking machine. A plurality of spaced L-shaped members 25 are mounted on each pair of conveyor runs and each of such members has an inwardly turned flange which cooperates with the L-shaped member of the other conveyor runs to receive and support opposite ends of the pallets 21. The inner runs of the conveyor 23 are adapted to be driven in a downward direction in any desired manner (not shown) to lower such pallets and the blocks carried thereby.

Mounted on the destacking machine 22 is a shaft or axle 26 journaled in bearings 27 and such shaft is provided with a pair of spaced sprockets 28 on which a pair of chains of a cross conveyor or transfer mechanism 29 are mounted. The cross conveyor 29 extends horizontally through the destacking machine between the generally vertical runs of the conveyor 23 and between the L-shaped support members 25 so that pallets carried by the L-shaped members will be lowered until they engage the upper runs of the cross conveyor and are removed one at a time from the support members 25. A motor 30 is selectively operated to move the cross conveyor 29 when desired. In order to stop the conveyor 23, a double pole limit switch 31, having a normally open contact 32 and a normally closed portion (not shown), is mounted on the destacking machine 22 in a position such that the pallet 21 will engage the limit switch 31 as the pallet comes to rest on the chains of the cross conveyor 29. Operation of the switch 31 will stop the operation of the conveyor 23 and simultaneously will condition a circuit for operating the motor 30 of the cross conveyor 29, as will be described later.

When the motor 30 of the cross conveyor 29 is operated, the pallet 21 resting thereon will be transferred from the destacking machine to the block sweep and pallet scraper machine 35 of the present invention. As the pallet moves into the block sweep and pallet scraper machine, the blocks 20 carried by the pallet will engage an activating bar 36 carried by a frame 37 of the machine. The activating bar 36 is associated with a double pole limit switch 38 which interrupts the flow of electrical energy to the motor 30 of the cross conveyor 29 to stop the cross conveyor. Simultaneously the limit switch 38 will operate a solenoid 39 to introduce fluid under pressure through a fluid line 40 into one end of a fluid cylinder 41. Introduction of fluid under pressure into the cylinder 41 will cause the piston rod 42 carried by the cylinder to be extended. A pallet aligning bar 43 is connected to the piston rod 42 and when the rod 42 is extended the pallet aligning bar 43 will engage one side of the pallet 21 and move the pallet against a stop 44 to align the blocks 20 with a discharge roller type conveyor 45 having one end connected to the frame 37. If desired, the pallet may be additionally supported in the machine 35 by a plurality of rollers 46. The upper portion of such rollers is generally in the same plane as the upper surface of the cross conveyor to help support the pallets during subsequent operations.

In order to remove the blocks 20 from the pallet 21, the frame 37 includes a pair of spaced generally parallel upper frame members 48 which support drive and driven shafts 49 and 50 journaled in bearings 51 and 52, respectively, carried by the upper frame members 48. A drive sprocket 53 is mounted on the drive shaft 49 between the upper members 48 and a driven sprocket 54 is mounted on the shaft 50 and adapted to be driven from the drive sprocket 53 by a chain 55. Exteriorly of one of the frame members 48, the drive shaft 49 is provided with a sprocket 56 driven by a chain 57 from a drive sprocket 58, which in turn is driven by a suitable source of power, such as a three-phase 60-cycle 450-volt reversing motor 59.

Figure 7:
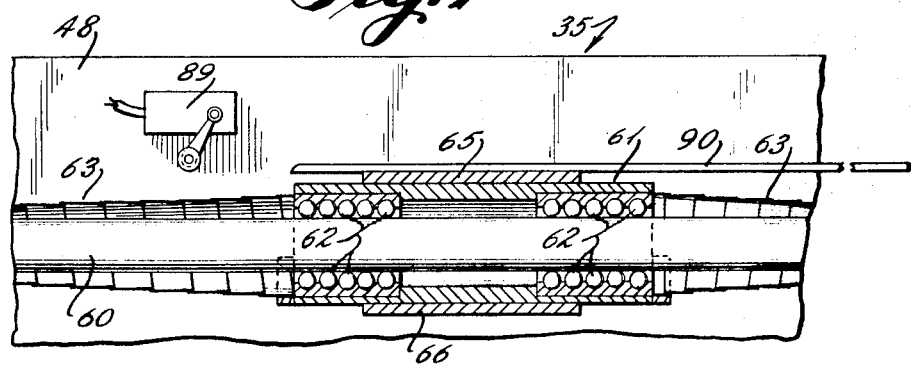
FIG. 7 is an enlarged detail section on the line 7—7 of FIG. 3.

A guide and support rod 60 is mounted on the inner side of each of the upper frame members 48 and extends substantially the entire length thereof. A sleeve 61 is slidably mounted on each of the support rods 60 in any desired manner, as by antifriction rollers 62 (FIG. 7), for axial movement along the rods. Preferably a coil spring type dust protector 63 extends from the sleeve 61 to opposite ends of the support rod 60 to permit movement of the sleeve along the support rod while excluding dust and other foreign matter from the bearing surfaces. The sleeves 61 at opposite sides of the frame 37 support a bridge 64 including upper and lower connecting plates 65 and 66 the opposite ends of which are connected to the upper and lower portions of the sleeves 61. In order to move the sleeves 61 and the bridge 64 along the supporting rods 60, the upper connecting plate 65 is connected to the drive chain 55 in any desired manner, as by lugs 68, so that when the shaft 49 is driven by the motor 59, the sleeves 61 will move axially along such support rods. A block pushing plate 67 is welded or otherwise attached to the lower connecting plate 66 and extends downwardly therefrom in a position to engage the blocks 20 and push the blocks off of the pallet 21 onto the discharge conveyor 45.

Mounted on the rear of the block pushing plate 67 is a generally vertically disposed fluid cylinder 70 having fluid lines 71 and 72 through which fluid under pressure is adapted to be introduced into and discharged from the cylinder 70. A piston rod 73 carried by the fluid cylinder 70 is adapted to be selectively extended and retracted out of and into the fluid cylinder 70. The piston rod 73 has a yoke 74 pivotally connected to an upstanding lug 75 carried by a blade attachment plate 76. A scraper blade 77 having a hardened insert or tip 78 is attached to the blade attachment plate 76 in a manner that when the piston rod 73 is extended the insert 78 will engage the upper surface of the pallet 21.

A pair of spaced guide members or sleeves 79 are mounted on the rear of the block pushing plate 57 and are adapted to slidably receive guide pins 80 fixed to opposite ends of the blade attachment plate 76 so that when the piston rod 73 is extended the pins 80 will guide the scraper blade 77 into engagement with the upper surface of the pallet. When the scraper blade 77 engages the upper surface of the pallet 21, a rearward pressure will be created against the scraper blade, particularly when the blade engages residue of the block material which has adhered to the pallet. To relieve this pressure a pair of blade support rollers 81 are provided with each roller being rotatably supported by a pin 82 carried by a lug 83 mounted on each of the guide members 79. The rollers are adapted to engage the rear surface of the scraper blade 77 to permit generally vertical movement and to prevent any rearward movement of the blade.

In order to control the movement of the block pushing plate 67, a pair of limit switches 84 and 85 are mounted at opposite ends of one of the upper frame members 48 in a position to be engaged by a lug plate 86 carried by the bridge 64 and having upstanding lugs 87 and 88 which engage the limit switches 84 and 85, respectively. Intermediate the ends of the frame members 48 is a switch 89 engageable by an elongated cam 90 attached to the bridge 64 in any desired manner. The switch 89 is adapted to control a solenoid 91 connected to a distributing valve for introducing fluid into and out of the fluid cylinder 70 to extend and retract the scraper blade 77.

After the blocks 20 have been discharged from the pallet 21 onto the conveyor 45 and the bridge 64 has returned to its initial position, the cross conveyor 29 again is operated to transfer another pallet from the destacking machine 22 and simultaneously move the pallet which has been scraped onto a pallet discharge conveyor 92.

Figure 8:
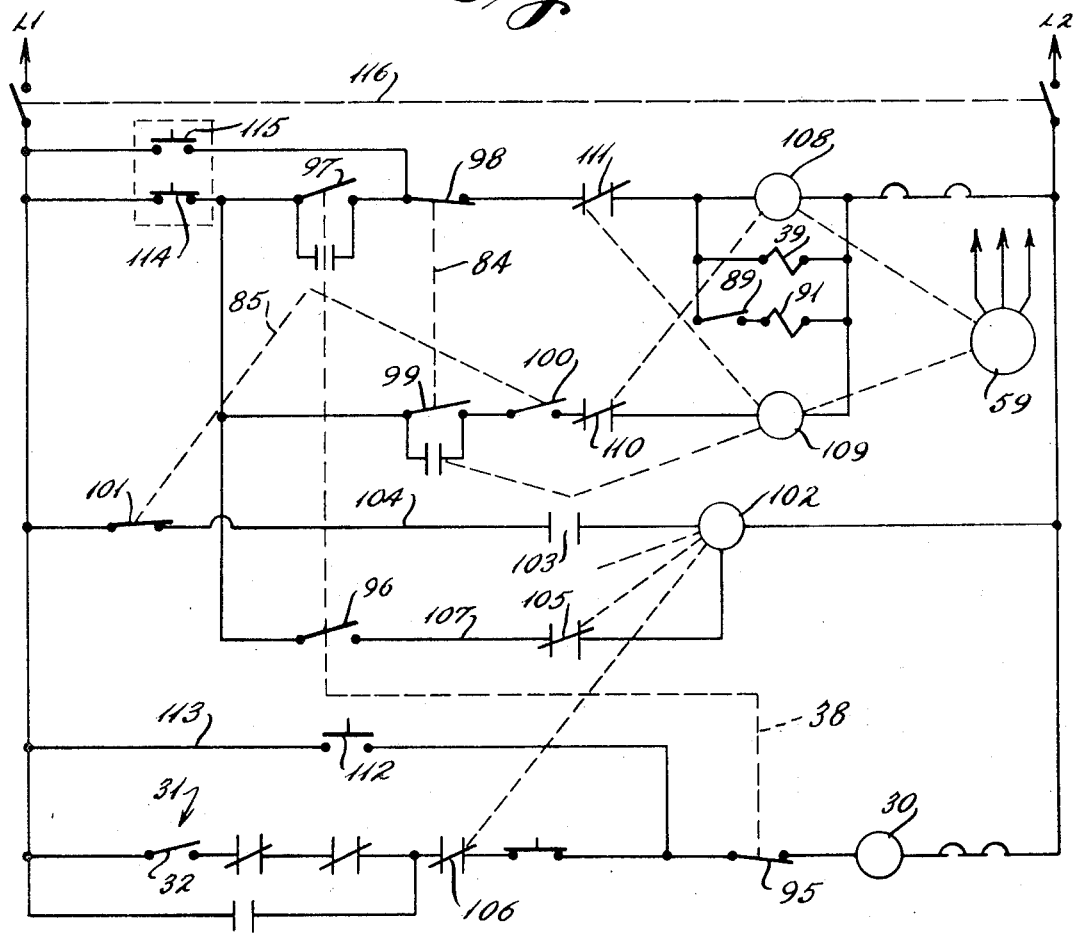
FIG. 8 is a wiring diagram of the apparatus.

As illustrated in FIG. 8, the limit switch 38 associated with the activating bar 36 includes a normally closed contact 95 and normally open contacts 96 and 97. When the bridge 64 is in retracted position, the limit switch 84 at the forward end of the frame 37 includes a normally closed contact 98 disposed in the circuit for driving the motor 59 in a forward direction and a normally open contact 99 disposed in the circuit for driving the motor in the reverse direction. The limit switch 85 located at the rear of the frame 37 includes a normally open contact 100 disposed in the circuit for reversing the motor 59 and a normally closed contact 101 adapted to provide electrical energy to a lock-out relay 102.

The relay 102 includes a normally open contact 103 located in a line 104 connected to one of the windings of the relay 102 and a pair of normally closed contacts 105 and 106, the contact 105 being located in a line 107 connected to the other winding of the relay 102, and the contact 106 being located in the line to the cross conveyor motor 30. As illustrated, forward and reversing relays 108 and 109, respectively, are provided, with the forward relay 108 having a normally closed contact 110 disposed in the reverse winding of the motor 59, and the reverse relay 109 having a normally closed contact 111 in the forward winding of the motor 59.

If desired, the cross conveyor motor 30 can be operated manually for test purposes by operation of a line switch 112 located in a bypass line 113. Also the sweep motor 59 is provided with a normally closed line switch 114 for automatic operation and a normally open line switch 115 for manual operation. A master control switch 116 is provided in the service line for supply electrical energy to the system.

In the operation of the device, the conveyor 23 of the destacking machine 22 is operated to lower a pallet 21 having blocks 20 thereon until the pallet is placed on the cross conveyor 29. The placing of the pallet on the cross conveyor will close the normally open contact 32 of the limit switch 31 to condition the cross conveyor 29 for operation, and simultaneously will open the normally closed contact (not shown) of the limit switch 31 to stop downward movement of the conveyor 23.

If the bridge 64 is in retracted position, the closing of the contact 32 energizes the cross conveyor motor 30 so that the cross conveyor 29 will remove the pallet 21 and blocks 20 from the destacking machine 22, and will transfer the same to the block sweep and scraper machine 35 until the blocks 20 engage and move the activating bar 36. Movement of the activating bar opens the normally closed contact 95 of the limit switch 38 to interrupt the flow of electrical energy to the cross conveyor motor 30 to stop the cross conveyor 29, and simultaneously closes the normally open contacts 96 and 97. The closing of the contact 96 permits current to flow through the line 107 to the lock-out relay 102 so that the normally closed contacts 105 and 106 are opened and the normally open contact 103 is closed. This prevents operation of the motor 30 until the contact 106 again is closed. When the contact 97 is closed, electrical energy flows to the forward relay 108 which will open the normally closed contact 110 and operate the motor 59 in a forward direction. Simultaneously electrical energy will be supplied to the solenoid 39 to cause fluid pressure to be introduced into the cylinder 41 so that the pallet aligning bar 43 will move the pallet 21 against the stop 44.

Operation of the motor 59 will move the bridge 64 along the support rods 60 and away from the limit switch 85. As soon as the bridge moves away from the switch 85, the normally closed contact 101 opens and the normally open contact 100 closes. As the bridge continues to move in a forward direction, cam 90 engages the switch 89 and operates the solenoid 91 to cause fluid under pressure to be introduced into the cylinder 70 to extend the scraper blade 77 into engagement with the upper surface of the pallet 21.

During the forward movement of the bridge 64, the block pushing plate 67 engages the blocks 20 and pushes such blocks from the pallet onto the discharge conveyor 45. As the last block is being pushed onto the conveyor, the lug 87 carried by the bridge engages the limit switch 84, opens the normally closed contact 98 and closes the normally open contact 99. The opening of the contact 98 will interrupt the flow of electrical energy to the forward relay 108 which stops forward movement of the motor 59 and simultaneously closes the contact 110. The closing of the contact 99 permits electrical energy to flow to the reversing relay 109 to operate the motor 59 in a reverse direction, and simultaneously opens the normally closed contact 111 to move the bridge 64 in a reverse direction.

At this time the blocks 20 will have cleared the activating bar 36 and such bar will return by gravity to its normal operating position to close the contact 95 and open the contacts 96 and 97. When the contacts 97 and 98 are open, electrical energy will no longer flow to the solenoids 39 and 91 and therefore the fluid cylinders 41 and 70 are retracted and thereby retract the pallet aligning bar 43 and the scraper blade 77, respectively, even though the cam 90 maintains the switch 89 in closed condition. As soon as the bridge 64 begins its return movement, the lug 87 will be removed from the limit switch 84 and the contacts 98 and 99 will return to closed and open positions, respectively. As the bridge returns to its retracted position, the lug 88 engages the limit switch 85 to open contact 100 and close contact 101. The closing of contact 101 energizes the winding of lock-out relay 102 through the contact 103 which is now closed. Operation of the lock-out relay opens contact 103 and closes contacts 105 and 106.

While the bridge 64 has been operating to remove the blocks from the pallet within the machine 35, the destacking machine 22 will have been operated to lower another pallet onto the cross conveyor 29 to close the contact 32 of the limit switch 31. However, even though the contact 32 has been closed, the motor 30 of the cross conveyor cannot be operated until the bridge has returned to its retracted position, and the contact 106 of the lock-out relay 102 has again been closed. As soon as the contact 106 is closed, the motor 30 will be operated and the process will be repeated.

I claim:

1. Apparatus for removing objects from generally pallet type supports and for cleaning the latter, said apparatus comprising support structure, a pusher member having a pushing surface and movable along said support structure in a position to engage and move said objects from said pallet type supports, scraper means carried by said member in spaced relation to said surface and being selectively movable relative thereto, and means for moving said scraper means into contact with said pallet type supports to remove residue remaining thereon while said objects are being removed.

2. Apparatus for removing objects from a pallet on which they are formed comprising a frame, first conveyor means for moving a pallet with an object thereon into said frame, means for stopping said first conveyor means when said pallet is in predetermined position, pusher means mounted for movement along said frame and having a surface in a position to engage the object on said pallet when said pusher means is moved, means for moving said pusher means along said frame, scraper blade means movably mounted on said pusher means in spaced relation to said surface, means for moving said scraper blade means into engagement with said pallet as said pusher means is removing objects from the same, second conveyor means onto which said objects are discharged, and means for discharging said pallet after the object has been removed therefrom.

3. The structure of claim 2 including means on said frame for moving said pallet against a fixed stop and holding said pallet while the object is being removed.

4. The structure of claim 2 including at least one guide member mounted on said pusher means and adapted to guide said scraper blade.

5. The structure of claim 2 in which said pusher means includes a bridge mounted on a pair of elongated generally parallel support rods, and sleeve means slidably mounted on each of said support rods adapted to support said bridge.

6. The structure of claim 5 including dust protectors disposed about said support rods.

7. The structure of claim 2 in which said scraper blade means includes a hardened portion for engaging and removing foreign material from the upper surface of said pallet.

8. The structure of claim 2 including means for reversing the direction of movement of said pusher means and returning said pusher means to a position adjacent to one end of said frame after the object has been removed from said pallet.

9. The structure of claim 2 including means for driving said first conveyor means only when said pusher means is in retracted position.

10. A building block sweep and pallet scraper for removing a plurality of building blocks from a pallet on which they have been formed comprising a frame, first conveyor means for moving a pallet with building blocks thereon into said frame, means for stopping said first conveyor means when the building blocks are in a predetermined position, fluid means for moving said pallet against a fixed stop and holding said pallet in position while the blocks are being removed, a pair of elongated spaced generally parallel support rods mounted on said frame, sleeve means slidably mounted on each of said support rods, a bridge fixed at opposite ends to said sleeves and extending substantially across said frame, means for moving said bridge along said support rods, a pusher plate carried by said bridge and adapted to engage at least one of the building blocks on said pallet to remove said blocks therefrom, second conveyor means connected to said frame for receiving building blocks from said pallet, at least one scraper blade mounted for generally vertical movement on said pusher plate, means for moving said scraper blade into engagement with the upper surface of said pallet as the building blocks are being removed therefrom, and means for discharging said pallet from said frame after the building blocks have been removed.

References Cited

UNITED STATES PATENTS

| 2,376,457 | 5/1945 | Skoog | 198—222 |
| 2,752,621 | 7/1956 | Warsaw | 15—93 C |

FOREIGN PATENTS

| 648,105 | 9/1964 | Belgium | 198—222 |

LEON G. MACHLIN, Primary Examiner

U.S. Cl. X.R.

25—41; 214—310